(12) United States Patent
Hellsten et al.

(10) Patent No.: US 8,375,971 B2
(45) Date of Patent: *Feb. 19, 2013

(54) USE OF A ZWITTERIONIC SURFACTANT TOGETHER WITH AN ANIONIC ETHER-CONTAINING SURFACTANT AS A DRAG-REDUCING AGENT

(75) Inventors: Martin Hellsten, Ödsmål (SE); Hans Oskarsson, Stenungtsund (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,152

(22) Filed: Jun. 21, 2011

(65) Prior Publication Data

US 2011/0247699 A1    Oct. 13, 2011

Related U.S. Application Data

(63) Continuation of application No. 10/470,033, filed as application No. PCT/SE02/00059 on Jan. 15, 2002, now Pat. No. 7,987,866.

(30) Foreign Application Priority Data

Jan. 23, 2001 (SE) .................................. 0100176

(51) Int. Cl.
*F17D 1/16* (2006.01)
*B01D 17/00* (2006.01)
*B01F 17/18* (2006.01)
*C08K 5/00* (2006.01)
*C11D 1/10* (2006.01)

(52) U.S. Cl. .......... 137/13; 516/113; 516/200; 516/203; 252/78.1; 252/79; 510/490

(58) Field of Classification Search .................. 516/113, 516/200, 203; 137/13; 510/490; 252/78.1, 252/79

See application file for complete search history.

(56) References Cited

U.S. PATENT DOCUMENTS

| 3,950,417 | A | * | 4/1976 | Verdicchio et al. | 510/125 |
|---|---|---|---|---|---|
| 4,615,825 | A | * | 10/1986 | Teot et al. | 516/67 |
| 4,828,765 | A | * | 5/1989 | Ohlendorf et al. | 562/477 |
| 5,143,635 | A | * | 9/1992 | Young et al. | 508/518 |
| 5,339,855 | A | * | 8/1994 | Hellsten et al. | 137/13 |
| 5,389,304 | A | * | 2/1995 | Repinec et al. | 510/237 |
| 5,902,784 | A | * | 5/1999 | Hellsten et al. | 510/427 |
| 5,911,236 | A | * | 6/1999 | Hellsten et al. | 137/13 |

FOREIGN PATENT DOCUMENTS

WO        WO 96/28527        9/1996

OTHER PUBLICATIONS

Ex parte Ghuman et al @ http://www.uspto.gov/web/offices/dcom/bpai/prec.htm , decided May 1, 2008 (Downloaded Oct. 22, 2008), pp. 1-6.
Klein, Evaluating Shampoo Foam online @ http://www.zenitech.com/documents/EVALUATING%20FOAM.pdf, pp. 1.2,reprinted from Oct. 2004 Cosmetics & Toiletries magazine May 9, 2006.
Turbiscan, Surfactant, Control of the Quality and the Performance of Surfactants online pp. 1-2 (May 9, 2006).
Siriwatwechakul et al., "Effects of organic solvents on scission energy of rodlike micelles," Langmuir, vol. 20, pp. 8970-8974, (Sep. 2004).
Ulmius et al., "Viscoelasticity in Surfactant Solutions . . . Periodic Colloidal Structures," J. Phys. Chem., 83 (17), pp. 2232-2236 (1979).

* cited by examiner

*Primary Examiner* — Daniel S Metzmaier
(74) *Attorney, Agent, or Firm* — Ralph J. Mancini; Sugiarto Hadikusumo

(57) ABSTRACT

The present invention relates to the use of a zwitterionic surfactant in combination with an ether sulphate or ether carboxylate surfactant in a water-based system as a drag-reducing agent. The combination has besides a high drag-reducing effect also a low sensitivity to hard water.

11 Claims, No Drawings

USE OF A ZWITTERIONIC SURFACTANT TOGETHER WITH AN ANIONIC ETHER-CONTAINING SURFACTANT AS A DRAG-REDUCING AGENT

This application is a continuation of U.S. patent application Ser. No. 10/470,033 filed on Jul. 23, 2003 now U.S. Pat. No. 7,987,866, which was filed under 35 U.S.C. 371 as PCT Application No. PCT/SE02/00059, filed Jan. 15, 2002, and Swedish Patent Application No. 0100176-7, filed Jan. 23, 2001.

The present invention relates to the use of a zwitterionic surfactant together with an ether sulphate or ether carboxylate surfactant in a water-based system as a drag-reducing agent.

Surfactants with the ability to form extremely long, cylindrical micelles have, in recent years, attracted a great interest as drag-reducing additives to systems with circulating water, especially those destined for heat or cold distribution.

An important reason for this interest is that, although one desires to maintain a laminar flow in the conduits, one wishes at the same time to have turbulence in the heat exchangers to achieve therein a high heat transfer per unit area.

As may easily be understood, fibres or chain polymers are unable to provide this double function which, however, can be achieved with thread-like micelles, since the micelles, which are responsible for the drag reduction, can be destructed by mechanical devices either within the heat exchangers or immediately before them. Thus a turbulent flow will be created within said heat exchangers. In the tube after the exchanger the micelles will form again rather rapidly and the drag reduction will thus be restored.

The thread-like micelles are distinguished by operating in a fairly disorderly fashion at low Reynold's numbers (below $10^4$), having no or only a very slight effect on the flow resistance. At higher Reynold's numbers (above $10^4$), the micelles are paralleled and result in a drag reduction very close to that which is theoretically possible. At even higher Reynold's numbers (e.g. above $10^5$) the shear forces in the liquid become so high that the micelles start to get torn and the drag-reducing effect rapidly decreases as the Reynold's number increases above this value.

The range of Reynold's numbers within which the surface-active agents have a significant drag-reducing effect is dependent on the concentration, the range increasing with the concentration.

By choosing the right concentration of surface-active agents and suitable flow rates in conduits and adequate devices before or in the heat exchangers, it is thus possible to establish a laminar flow in the conduits and turbulence in the heat exchangers. Thus, the dimensions of the conduits can be kept at a low level and the pump size, or the number of pump stations, and consequently the pump work, can alternatively be reduced while retaining the same tubular dimensions.

In WO 96/28527 a drag reducing agent is disclosed, which comprises a betaine surfactant in combination with a sulphonate or sulphate surfactant. This drag-reducing agent is effective within comparatively large temperature ranges. However, the sulphate surfactant is rather sensitive to hard water, while the sulphonate surfactant is not regarded as easily biodegradable under anaerobic conditions.

It has now surprisingly been found that essential improvements are achieved by the use of a zwitterionic surfactant having the formula

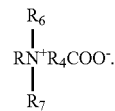

(I)

R is a group containing saturated or unsaturated aliphatic or acyl group with 10-24 carbon atoms, $R_6$ and $R_7$ are independently of each other an alkyl group of 1-4 carbon atoms or an hydroxyalkyl group of 2-4 carbon atoms, and $R_4$ is an alkylene group of 1-4 carbon atoms, preferably $CH_2$ or a group

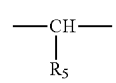

where $R_5$ is an alkyl group of 1-3 carbon atoms, in combination with an anionic ether surfactant having the general structure $R_1(OA)_nB$, $R_1O(AO)_nC_mH_{2m}D$ or $R_3NH(AO)_nC_mH_{2m}D$ or a mixture thereof, where $R_1$ is a hydrocarbon group of 10-24 carbon atoms, $R_3$ is an acyl group of 10-24 carbon atoms, A is an alkylene group having 2-4 carbon atoms, n is a number from 1 to 10, m is 1-4, B is a sulphate group $OSO_3M$, D is a carboxylate group COOM, and M is a cationic, preferably monovalent group, in a weight proportion between the zwitterionic surfactant and the anionic ether surfactant or ether surfactants of from 100:1 to 1:1, preferably from 50:1 to 2:1, as a drag-reducing agent in a flowing water-based liquid system. By "water-based" is meant that at least 50% by weight, preferably at least 90% by weight, of the water-based liquid system consists of water. The total amount of the zwitterionic surfactant and the anionic ether surfactants may vary within wide limits depending on the conditions but is generally 0.1-10 kg/m³ of the water-based system. The combinations of the zwitterionic and the anionic ether surfactants are especially suited for use in water-based systems flowing in long conduits, for distribution of heat or cold.

The group R in the zwitterionic surfactant is suitably an aliphatic group or a group $R'NHC_3H_6$, where R' designates an acyl group with 10-24 carbon atoms. Preferably the zwitterionic surfactant has the general formula

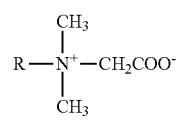

(III)

where R is the aliphatic group or the group $R'NHC_3H_6$— where R' has the meaning mentioned above. In the anionic ether surfactant the hydrophobic group $R_1$ can be aliphatic or aromatic, straight or branched, saturated or unsaturated. Furthermore, the groups A are preferably ethylene, n is preferably a number from 1-5 and $C_mH_{2m}$ is preferably methylene or the group

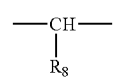

where $R_8$ is an alkyl group of 1-3 carbon atoms. The group M is preferably sodium and potassium.

Both the zwitterionic surfactant and the anionic ether surfactants are readily biodegradable and tolerant towards hard water and electrolytes and said combination gives an excellent drag reducing effect within a wide temperature range. Thus, the drag-reducing additives may be used in a cooling media at temperatures below 20° C., when using surfactants, where the groups R and R' have 12-16 carbon atoms, and in a heat-transfer medium at a temperature in the range of 50-120° C., when using surfactants where the groups R, and R' contain 18, 20 or 22 carbon atoms or more. The number of carbon atoms in the hydrophobic groups R, R', $R_1$ and $R_3$ will affect the useful temperature range for the mixture so that a high number will give products suitable for high temperatures and vice versa. The groups R and $R_1$ can suitably be dodecyl, tetradecyl, hexadecyl, octadecyl, oleyl, eicosyl, docosyl, rape seed alkyl and tallow alkyl and the groups R' and $R_3$ the corresponding acyl groups. Also aromatic groups, such as nonylphenyl, may be used.

Furthermore, the zwitterionic and anionic surfactants are suitably chosen in such a manner that the crystallisation temperature for the combination is suitably below the lowest temperature for which the water-based system is intended. Suitably the zwitterionic surfactant is combined with an anionic ether sulphate surfactant where n is 1-5 and OA oxyethylene, since the ether sulphate is easy to produce and gives in combination with the zwitterionic surfactant excellent drag-reducing effects.

The zwitterionic surfactant can be produced by reacting a compound of the formula $RNR_6R_7$, where R has the meaning mentioned above, with Na-chloroacetate at 70-80° C. and a constant pH-value of 9.5 in a medium of a lower alcohol and water. To obtain a good drag reducing effect it is essential that the amount of the amine reactant in the zwitterionic product used is low. If a low chloride content in the product is necessary the reaction can preferably be made in isopropanol with the lowest water content possible, whereby the sodium chloride formed in the reaction will crystallise out of the product and may be removed by filtration or centrifugation. Another route to a chloride-free product is to quaternize the amine reactant with ethylene oxide in the presence of an acid catalyst and then dehydrogenate the resulting product to the desired zwitterionic surfactant.

The anionic ether surfactants suitable for use in accordance with the invention are well-known products and so are also the production methods. Typical examples are aliphatic mono (oxyethylene) sulphates, alkyl di(oxyethylene) sulphates and alkyl tri(oxyethylene) sulphates derived from ethoxylated alcohols by sulphation with $SO_3$ and the corresponding carboxylates obtained by reacting said ethoxylated alcohol and a halogenated carboxylate having the formula $HalC_mH_{2m}COOM$, where Hal is chloride or bromide and M and m have the meanings mentioned above. The amido ether carboxylate may be produced according to well-known methods including the reaction of said halogenated carboxylate and the amidoalkoxylate $R_3NH(AO)_nH$, where $R_3$, A and n have the meanings mentioned above.

The choice of the zwitterionic surfactant and the anionic ether surfactant will depend of the temperature of the water-based system. At low temperature the number of carbon atoms will normally be lower than at high temperature while the number of oxyalkylene will normally be higher at lower temperatures than at higher temperatures.

A convenient way to determine the right proportion between the zwitterionic surfactant and the anionic surfactant for a certain type of water is to make up a solution of e.g. 0.500 kg/m³ of the zwitterionic surfactant in the appropriate water in a 50 ml glass beaker with a magnetic stirrer and keep the temperature in the middle of the intended temperature range for the system. This solution is then titrated with a solution of the anionic ether surfactant with a concentration of 10 kg/m³ in the appropriate water until the originally formed vortex has disappeared.

Apart from the zwitterionic and anionic surfactant, the water-based system may contain a number of conventional components such as corrosion inhibitors, anti-freeze and bactericides.

The present invention will now be further illustrated with the aid of the following examples.

EXAMPLE 1

The drag reducing temperature interval was determined in the beaker test described above. In the beaker test the surfactant mixture was stirred at a constant rotation speed of 700 r/min using a combined magnetic stirrer and heating plate. The absence of vortex or a vortex of max. 2 mm was equal to drag reducing conditions. In temperatures above 100° C. a glass pressure reactor was used.

From stock solutions mixtures of betaine and anionic surfactant were prepared. The mixtures were diluted with water, with hardness according to the tables below, to 1000 ppm betaine and a total volume of 40 ml in a 50 ml beaker. The amount of anionic surfactant is given as ppm in brackets. The pH was adjusted to 9-10 with ammonia.

TABLE 1

N-behenyl betaine (1000 ppm) for heating systems

| Anionic surfactant | DR interval (700 r/min) | | |
|---|---|---|---|
| | 0° dH | 3° dH | 8° dH |
| Sodium dodecyl sulphate | 55-120 (30) | 55-68 (30) | 55-68 (30) |
| Sodium dodecyl-(EO)$_3$-sulphate | 55-123 (40) | 55-108 (40) | 50-78 (40) |
| Dodecyl amide-(EO)$_2$-carboxylate | 55-104 (40) | 48-95 (40) | 49-86 (40) |
| Nonylphenol-(EO)$_3$-carboxylate | 53-97 (40) | 49-94 (40) | 49-74 (40) |

A drag reducing agent containing an anionic ether surfactant exhibits an essentially better drag reducing effect in water of 3° dH and 8° dH than the agent containing alkyl sulphate.

EXAMPLE 2

The present example is performed according to the previously described screening test.

In order to determine the right amount of anionic surfactant the betaine solution was kept at 13° C. in the test beaker with the magnetic stirrer running at 700 r.p.m and titrated with a water solution of the anionic surfactant until the vortex disappeared. The resulting concentration of anionic surfactant is given as ppm in brackets after the temperature range within which the composition has been found to give a drag reducing effect. The clear point (CP) of the solution is given in ° C.

The concentration of the N-myristyl-betaine, the zwitterionic surfactant used in this example, was 1000 ppm in all tests.

TABLE 2

N-myristyl-betaine (1000 ppm) in mixture with anionic surfactant for cooling systems

| Anionic surfactant | DR interval (700 r/min) | | |
|---|---|---|---|
| | 0° dH | 3° dH | 8° dH |
| Dodecyl benzene sulphonate | No effect (0-1130) CP 0° C. | 0-29 (430) CP 0° C. | 3-25 (980) CP 35° C. |
| Sodium dodecyl-(EO)$_3$-sulphate | 0-43 (288) CP 0° C. | 0-27 (550) CP 0° C. | 2-25 (510) CP 2° C. |
| Sodium dodecyl sulphate | 6-43 (400) CP 6° C. | 0-39 (336) CP 14° C. | 4-43 (360) CP 20° C. |

These formulations are intended for comfort cooling circuits where the temperature range normally is between 4 and 15° C.

As can be seen, the dodecyl glycolether sulphate is working well in this temperature range whereas the dodecyl benzene sulphonate formulation gives no drag reduction in deionized water and sodium dodecyl sulphate does not work satisfactory in water of 8° dH at low temperatures.

Furthermore the use of sodium dodecyl sulphate is hampered in practical applications by the precipitation both of the sodium and the calcium salts.

The invention claimed is:

1. A method for reducing drag in a flowing water-based liquid system flowing in conduits for the efficient distribution of heat or cold, which method consists essentially of adding to the water-based liquid system a combination consisting essentially of:
    i.) a zwitterionic surfactant having the formula

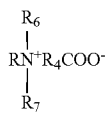

(I)

wherein R is a saturated or unsaturated aliphatic or acyl group with 10-24 carbon atoms, or a group R'NHC$_3$H$_6$— where R' is an acyl group having 10-24 carbon atoms, R$_6$ and R$_7$ are independently of each other an alkyl group of 1-4 carbon atoms or an hydroxyalkyl group of 2-4 carbon atoms, and R$_4$ is an alkylene group of 1-4 carbon atoms; and ii.) an anionic ether surfactant having the general structure

or a mixture thereof, where R$_1$ is a hydrocarbon group of 10-24 carbon atoms, R$_3$ is an acyl group of 10-24 carbon atoms, A is an alkylene group having 2-4 carbon atoms, n is a number from 1 to 10, m is 1-4, B is a sulphate group OSO$_3$M and D is a carboxylate group COOM, in which M is a cationic group;
    wherein the weight proportion between the zwitterionic surfactant and the anionic ether surfactant is from 100:1 to 1:1.

2. A method according to claim 1, wherein the zwitterionic surfactant has the general formula

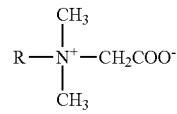

(III)

and wherein R is the aliphatic group or the group R'NHC$_3$H$_6$— where R' is the acyl group.

3. A method according to claim 2 wherein the groups R and R' contain 18-24 carbon atoms.

4. A method according to claim 3 wherein the group R and R$_1$ contain 12-16 carbon atoms.

5. A method according to claim 1 wherein the crystallization temperature for the combination of the zwitterionic surfactant and the anionic ether is below the lowest temperature for which the water-based system is intended.

6. A method according to claim 1 wherein the zwitterionic surfactant and anionic ether surfactant is added in a total amount of about 0.1 to about 10 kg/m$^3$ of the water-based system.

7. A method according to claim 1 wherein the groups R$_4$ and C$_m$H$_{2m}$ designate methylene.

8. A method according to claim 1 wherein the anionic ether surfactant is an ether sulphate, where n is 1-5 and OA is oxyethylene.

9. A method according to claim 1 wherein the water-based system is a cooling medium with a temperature of about 20° C. or lower.

10. A drag reducing agent for a flowing water-based liquid system, said drag reducing agent consists essentially of:
    i.) a zwitterionic surfactant having the formula

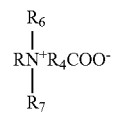

(I)

wherein R is a saturated or unsaturated aliphatic or acyl group with 10-24 carbon atoms, or a group R'NHC$_3$H$_6$— where R' is an acyl group having 10-24 carbon atoms, R$_6$ and R$_7$ are independently of each other an alkyl group of 1-4 carbon atoms or an hydroxyalkyl group of 2-4 carbon atoms, and R$_4$ is an alkylene group of 1-4 carbon atoms; and ii.) an anionic ether surfactant having the general structure

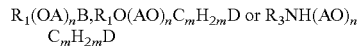

or a mixture thereof, where R$_1$ is a hydrocarbon group of 10-24 carbon atoms, R$_3$ is an acyl group of 10-24 carbon atoms, A is an alkylene group having 2-4 carbon atoms, n is a number from 1 to 10, m is 1-4, B is a sulphate group OSO$_3$M and D is a carboxylate group COOM, in which M is a cationic group;
    wherein the weight proportion between the zwitterionic surfactant and the anionic ether surfactant is from 100:1 to 1:1.

11. A flowing water based liquid system comprising the drag reducing agent of claim 10.

* * * * *